(12) United States Patent
Hawthorne et al.

(10) Patent No.: US 7,040,150 B2
(45) Date of Patent: May 9, 2006

(54) COMPUTERIZED SINGLE CAR TEST DEVICE SYSTEM

(75) Inventors: Michael J. Hawthorne, Arlington, TX (US); Richard J. Matusiak, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/934,694

(22) Filed: Sep. 7, 2004

(65) Prior Publication Data
US 2006/0048566 A1    Mar. 9, 2006

(51) Int. Cl.
*G01L 5/28* (2006.01)
(52) U.S. Cl. .................................................. 73/121
(58) Field of Classification Search ............... 73/121, 73/866.5, 37, 714, 39; 701/70; 702/114, 702/20; 246/169 R
See application file for complete search history.

(56) References Cited

U.S. PATENT DOCUMENTS

| | | | |
|---|---|---|---|
| 2,993,199 A | 7/1961 | Browne et al. | |
| 3,784,813 A * | 1/1974 | Ryan | 246/169 R |
| 4,847,770 A * | 7/1989 | Kane et al. | 701/20 |
| 5,394,137 A | 2/1995 | Orschek | |
| 5,786,998 A | 7/1998 | Neeson et al. | |
| 5,808,909 A | 9/1998 | Rees | 364/558 |
| 5,862,048 A | 1/1999 | Knight | |
| 6,035,250 A * | 3/2000 | Newton et al. | 701/70 |
| 6,175,784 B1 | 1/2001 | Jicha et al. | |
| 6,325,464 B1 | 12/2001 | Truglio et al. | |
| 6,327,894 B1 | 12/2001 | Vaughn | |
| 6,425,282 B1 * | 7/2002 | Vaughn | 73/39 |
| 6,680,918 B1 * | 1/2004 | Haley | 370/282 |
| 6,837,550 B1 | 1/2005 | Dougherty et al. | |

* cited by examiner

*Primary Examiner*—Eric S. McCall
*Assistant Examiner*—Octavia Davis
(74) *Attorney, Agent, or Firm*—Barnes & Thornburg LLP

(57) ABSTRACT

A test system for computerized single car test devices. The test system includes at least one car tester having a first connector for connecting a first port to a brake pipe of the car, valves for selectively interconnecting ports of the tester, at least one pressure sensor sensing pressure at one or more of the ports, a communication circuit and a local controller connected to the valves and sensor and programmed to perform a test of the brake system and connected to the communication circuit to transmit test results. A plurality of car testers may be in communion with and controlled by the central controller at the same time.

12 Claims, 2 Drawing Sheets

COMPUTERIZED SINGLE CAR TEST DEVICE SYSTEM

BACKGROUND AND SUMMARY OF THE DISCLOSURE

The present invention relates generally to a test device for the brake equipment of a railroad car and more specifically to a test system of computerized single car test devices for a rail car brake system.

The Association of American Railroads (AAR) has established Standard S-486 for testing railroad car brake systems for a single stand alone car. The standard has two sections, namely, Section 3 for Procedures For Repair Track Test For Air Brake Equipment and Section 4 for Test-Standards Single Capacity Freight Brake Equipment. The recent revisions to Standard S-486 provides for testing where brake cylinder measurement taps are provided. New Rule 88 is provided, which requires brake cylinder leakage tests as outlined in AAR Standard S-401.

Computerized single car test devices (CSCTDs) are well-known. See, for example, U.S. Pat. No. 6,327,894. These devices are connected to the glad hand at one end of the car, which is connected to the brake pipe. The other end is connected to a source of pressure. A connection to the brake cylinder is also provided. Various tests are performed automatically upon initiation by an operator. With wider acceptance of the CSCTD, the operator is free to do other activities during the automatic testing. Also, in a repair yard, more than one single car test can be performed at one time with multiple CSCTDs.

The present disclosure provides a test system for computerized single car test devices. The test system includes at least one car tester having a first connector for connecting a first port to a brake pipe of the car, valves for selectively interconnecting ports of the tester, at least one pressure sensor sensing pressure at one or more of the ports, a communication circuit and a local controller connected to the valves and sensor and programmed to perform a test of the brake system and connected to the communication circuit to transmit test results. A plurality of car testers may be in communion with and controlled by the central controller at the same time.

A central controller remote from the car tester is in communication with the car tester for instructing the local controller to perform the test and for receiving the test results. The local controller may communicate car specific information of the car it is to test to the central controller before the central controller instructs the local controller to initiate the test. The local controller communicates confirmation of pre-test procedures to the central controller before the central controller instructs the local controller to initiate the test. The car tester and the central controller are connected wirelessly or by wire.

Observations inputted by an operator at the local controller may be communicated to the central controller. The local controller includes tester calibration data and transmits the calibration data to the central controller during a test cycle. This may be transmitted with the test results earlier in the process. The calibration data may include one or more of date of last calibration, results of the calibration, device used for the calibration, standard used for the calibration, person performing the calibration and term of the calibration.

The central controller may be in communication via a network with a master database for railroads and receives car information from and transmits test information to the master database. The test information transmitted to the master database may include test date, test run and test results.

These and other aspects of the present disclosure will become apparent from the following detailed description of the disclosure, when considered in conjunction with accompanying drawings.

DETAILED DESCRIPTION OF THE DISCLOSURE

Figure 1:
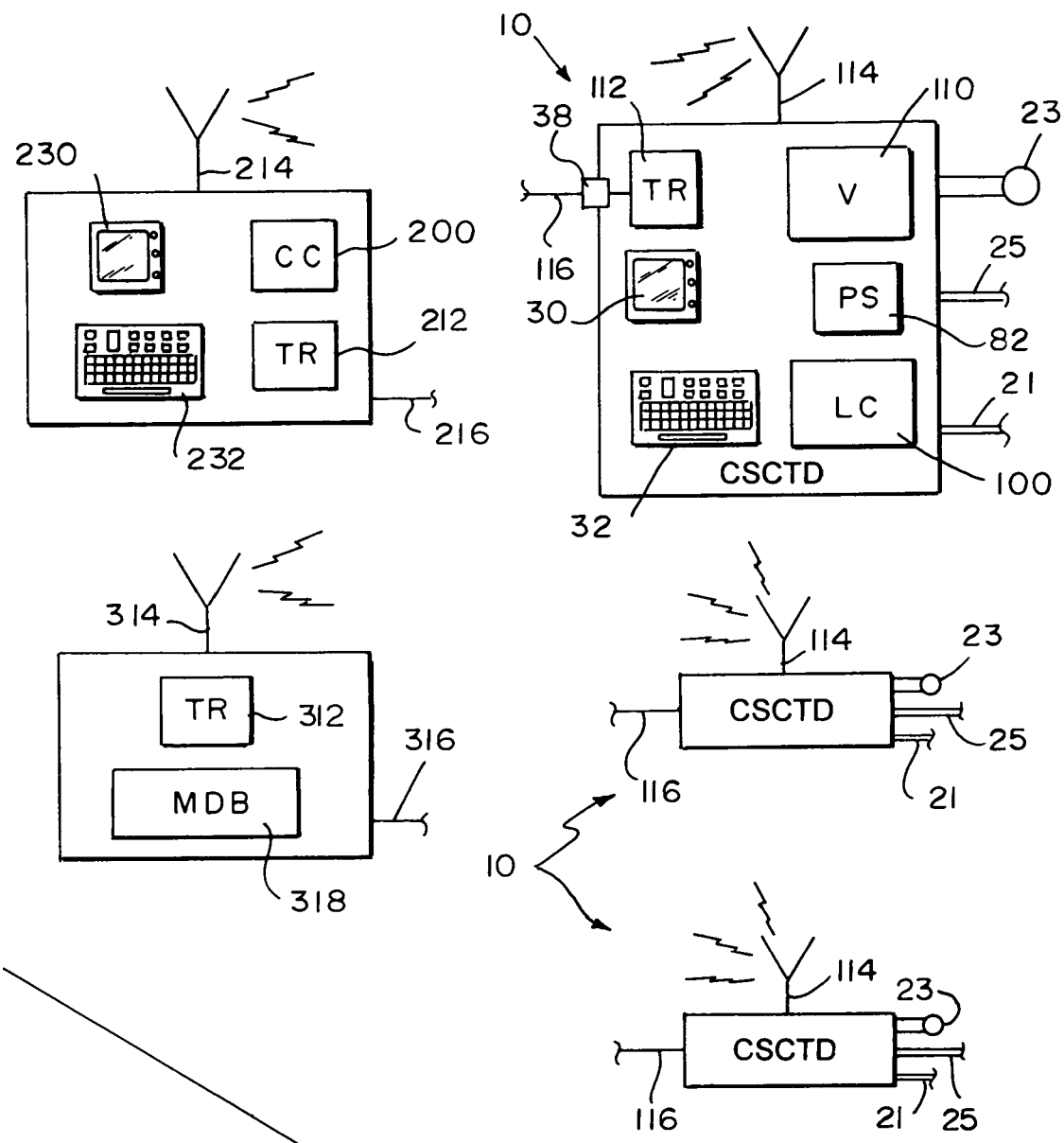
FIG. 1 is a schematic view of a test system of single car test devices incorporating the principles of the present disclosure.

A test system for single car test devices is illustrated in FIG. 1. A plurality of computerized single car test devices (CSCTDs) 10 is illustrated. As previously mentioned, one such CSCTD is described in U.S. Pat. No. 6,327,894. This is merely one example of a CSCTD, and others may be used. To the extent that it is applicable, the appropriate reference numbers have been used from this patent. This permits reference to the patent for further understanding of the operation of the CSCTD.

The CSCTD 10 includes a first port connected to the brake pipe of a car by a glad hand and hose 23. A source of pressurized air is connected through hose 21 on a source input port. Hose 25 connects a brake cylinder port to the brake cylinder of the single car brake system. A plurality of valves is illustrated by V 110, which controls the interconnection of the hoses 21, 23, 25. One or more pressure sensors PS or transducers is illustrated as 82. A local controller 100 is a signal processor or computer connected to the pressure sensor 82 and to control valves 110. The local controller 100 is programmed to perform the test of the brake system and communicates and transmits the test results to a remote location. A display 30 and an input device illustrated as a keyboard 32 are provided.

A communication device, illustrated as a transceiver 112, is provided and may communicate either via wireless via antenna 114 or over a wire 116 through port 38. Wire 116 may be a direct connection to other devices and may be part of a network or bus or may be a connection to a network over telephone lines (for example, the internet). The antenna 114 may also be a wireless connection to a network, such as the internet or cellular telephones.

A remote station is illustrated as including a central controller 200, a transceiver 212, display 230 and an input device 232. The transceiver 212 may communicate wirelessly via antenna 214 or over a cable 216. The central controller 200 is a signal processor or other computer. The central controller 200 and its related peripherals may be at a control tower of a repair yard or may be a portable device carried by an operator. The central controller 200 is in communication with the individual CSCTDs 10 for instructing the CSCTDs 10 to perform tests and to receive the test results. This allows the individual CSCTDs 10 to perform their tests simultaneously while allowing remote monitoring and control. This allows a single operator to initiate a plurality of single car tests, monitor their results remotely and initiate or re-initiate various test segments.

Also, illustrated in FIG. 1 is a master database 318 at a further remote location. A transceiver 312 communicates wirelessly via antenna 314 or via wire 316. This communication can be to the individual CSCTDs 10 and to the central controller 220. The master database 318 is a database that stores information about each of the cars or locomotives available. The transmission of the test results may be stored with the other information about the cars. The information from master database 318 may be provided to the central controller 220 to be compared against the information provided by the individual local controllers 100. The central controller 200 may also update the master database 318 on information received from the local controllers 100. This will allow the local controllers 100 to have shorter communication range. Alternatively, the information from local controllers 100 may be provided directly to the master database 318. One example of a centralized master database 318 presently available is known as Universal Machine Language Equipment Register (UMLER) for railroad equipment, which is available on the internet.

Figure 2:
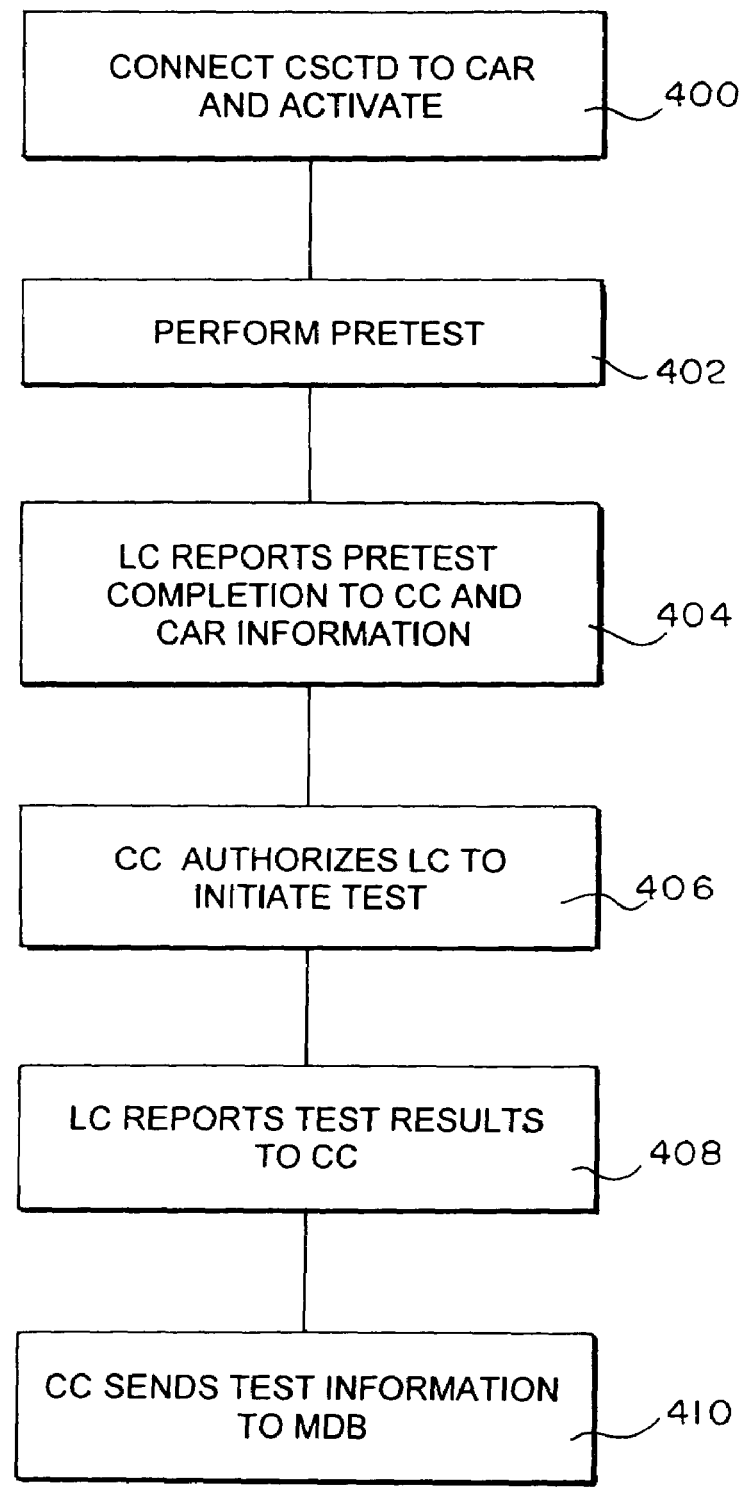
FIG. 2 is a flow diagram of a process of the test system of FIG. 1, according to the principles of the present disclosure.

An example of a process, method or test cycle using the system of FIG. 1 is illustrated in FIG. 2. In step 400, a CSCTD is connected to a car and activated. Pre-tests are performed at 402. Upon successful completion of the pre-tests, the local controllers 100 report pre-test completion to the central controller 200 at 404. Car information may be provided by the local controllers 100. As previously discussed, this information may also be provided from the master database 318. It may be provided from both sources and compared. Upon verification and other checking, the central controller 200 authorizes the local controller 100 to initiate the car test at step 406. This may occur automatically at central controller 200 or may require operator input through input device 232.

Once the test is completed or interrupted, the local controllers 100 report test results to the central controller 200. Once this information is stored, the operator at the central controller 200 may then re-initiate the test, initiate portions of the test or go to the car and make appropriate repairs. The test is then re-initiated either at the local controller 100 or the central controller 200. Finally, the central controller 200 sends test information to the main database at step 410. This allows the test information to be collected with the equipment item and accessible by different people within the owner, maintenance or operator chain. The tests results and test information include test date, the test run and the test results. Observations may be made by an operator of the car and its system and inputted via input 32 to the local controller 100. This information is then transmitted to the central controller 200. It may be transmitted independently or as part of the search results.

The local controller 100 may also include tester calibration data. This data may be transmitted to the central controller 200 during a test cycle. This may be at the beginning of the test cycle or may be part of the final test results. The calibration data include one or more of date of last calibration, results of the calibration, device used for the calibration, standard use for the calibration, persons performing the calibration and the term or the date when the next calibration is needed. If the calibration and operator observations are part of the test results, the single file can then be transmitted to the central controller 200 and the master database 318.

Although the present invention has been described and illustrated in detail, it is to be clearly understood that the same is by way of illustration and example only, and is not to be taken by way of limitation. The scope of the present invention are to be limited only by the terms of the appended claims.

What is claimed is:

1. A test system for a brake system of at least one single railroad car, the system comprising:
    at least one portable car tester including a first connecting for connection a first port to a brake pipe of the car, a second connector for connecting a second port to a brake cylinder of the car, valves for selectively interconnecting ports of the tester, at least one pressure sensor sensing pressure at one or more of the ports, a communication circuit and a local controller connected to the valves and sensor and programmed to perform a test of the brake system of the car and connected to the communication circuit to transmit test results; and
    a central controller remote from and in communication with the car tester for instructing the local controller to perform a single car test and for receiving the test results.

2. The test system according to claim 1, wherein the local controller communicates car specific information of the car, that the tester is to test, to the central controller before the central controller instructs the local controller to initiate the test.

3. A test system for a brake system of at least one single railroad car, the system comprising:
    at least one car tester including a first connector for connecting a first port to a brake pipe of the car, valves for selectively interconnecting ports of the tester, at least one pressure sensor sensing pressure at one or more of the ports, a communication circuit and a local controller connected to the valves and sensor and programmed to perform a test of the brake system and connected to the communication circuit to transmit test results;
    a central controller remote from and in communication with the car tester for instructing the local controller to perform the test and for receiving the test results; and
    wherein the local controller independently performs a pretest of the tester and communicates confirmation of pre-test procedures to the central controller before the central controller instructs the local controller to initiate the test.

4. The test system according to claim 1, wherein observations inputted by an operator at the local controller are communicated to the central controller.

5. The test system according to claim 1, wherein the car tester and the central controller are connected wirelessly.

6. The test system according to claim 1, wherein the car tester and the central controller are connected by wire.

7. The test system according to claim 1, wherein the local controller includes tester calibration data and transmits the calibration data to the central controller during a test cycle.

8. The test system according to claim 7, wherein the calibration data includes one or more of date of last calibration, results of the calibration, device used for the calibration, standard used for the calibration, person performing the calibration, and term of the calibration.

9. The test system according to claim 1, wherein the central controller is in communication via a network with a master database for railroads and receives car information from and transmits test information to the master database.

10. The test system according to claim 9, wherein the test information transmitted to the master database includes test date, test run and test results.

11. The test system according to claim 1, including a plurality of car testers in communion with and controlled by the central controller.

12. The test system according to claim 9, wherein the master database is a Universal Machine Language Equipment Register usable by owners, maintenance personal and operators.

\* \* \* \* \*